United States Patent
Boshernitzan et al.

(10) Patent No.: US 9,996,738 B2
(45) Date of Patent: Jun. 12, 2018

(54) SYSTEM AND METHOD FOR CONTROLLING A TERMINAL DEVICE

(71) Applicant: Swan Solutions Inc., Houston, TX (US)

(72) Inventors: Yaniv Boshernitzan, Houston, TX (US); Ohad Nezer, Houston, TX (US)

(73) Assignee: Swan Solutions, Inc., Austin, TX (US)

(*) Notice: Subject to any disclaimer, the term of this patent is extended or adjusted under 35 U.S.C. 154(b) by 11 days.

(21) Appl. No.: 15/043,283

(22) Filed: Feb. 12, 2016

(65) Prior Publication Data

US 2016/0239707 A1     Aug. 18, 2016

Related U.S. Application Data

(60) Provisional application No. 62/115,769, filed on Feb. 13, 2015.

(51) Int. Cl.
| | |
|---|---|
| *G06F 3/043* | (2006.01) |
| *G06K 9/00* | (2006.01) |
| *G06F 3/041* | (2006.01) |
| *G06K 9/32* | (2006.01) |

(52) U.S. Cl.
CPC ......... *G06K 9/00335* (2013.01); *G06F 3/043* (2013.01); *G06F 3/0416* (2013.01); *G06K 9/3233* (2013.01)

(58) Field of Classification Search
CPC ...... G06F 3/017; G06F 3/0414; G06F 3/0433; G06F 3/0436; G06F 3/0488; G06K 9/00335; G06K 9/3233; G06K 9/6201
See application file for complete search history.

(56) References Cited

U.S. PATENT DOCUMENTS

| | | | | |
|---|---|---|---|---|
| 4,377,049 A | * | 3/1983 | Simon | G09F 3/18 200/309 |
| 5,103,085 A | * | 4/1992 | Zimmerman | G01S 17/06 250/214 B |
| 5,971,761 A | | 10/1999 | Tillman, Sr. | |
| 6,335,722 B1 | * | 1/2002 | Tani | G05B 23/0216 345/173 |

(Continued)

FOREIGN PATENT DOCUMENTS

WO     2013165348     11/2013

*Primary Examiner* — Joe H Cheng
(74) *Attorney, Agent, or Firm* — Andrew W. Chu; Craft Chu PLLC

(57) ABSTRACT

A control system includes a housing engaged to a mounting surface, a sensor contained within the housing, a server in communication with the sensor, and a terminal device in communication with the server. A gesture by a user associated with the mounting surface controls activity of the terminal device, such as a knock on a wall lowering a thermostat. The control system enables a mounting surface independent from the terminal device to become a controller for the terminal device. The sensor forms an interactive zone, and a contact interaction with the mounting surface within the interactive zone is detected by the sensor as data signals. The server receives the data signals, determines a data pattern corresponding to the data signals, and matches the data pattern with a gesture profile. The gesture profile is associated with a command transmitted to the terminal device to control activity of the terminal device.

13 Claims, 6 Drawing Sheets

(56) References Cited

U.S. PATENT DOCUMENTS

| | | | |
|---|---|---|---|
| 8,228,315 B1 | 7/2012 | Starner et al. | |
| 8,665,237 B2 * | 3/2014 | Koshiyama | G06F 3/0412 345/156 |
| 8,788,978 B2 | 7/2014 | Stedman et al. | |
| 9,812,004 B1 * | 11/2017 | Boshernitzan | G08C 17/02 |
| 2004/0214617 A1 * | 10/2004 | Kanazawa | H04L 12/2823 455/574 |
| 2005/0046584 A1 * | 3/2005 | Breed | B60C 11/24 340/13.31 |
| 2006/0164253 A1 * | 7/2006 | Harvey | G08B 29/26 340/628 |
| 2007/0080819 A1 * | 4/2007 | Marks | G08B 17/10 340/628 |
| 2010/0001992 A1 | 1/2010 | Van Loenen et al. | |
| 2010/0017407 A1 * | 1/2010 | Beniyama | G06F 17/30259 707/E17.016 |
| 2010/0053152 A1 * | 3/2010 | Lewis | G06T 19/00 345/419 |
| 2012/0249416 A1 | 10/2012 | Maciocci et al. | |
| 2013/0321346 A1 | 12/2013 | Tyler et al. | |
| 2014/0050354 A1 | 2/2014 | Heim | |
| 2014/0088794 A1 * | 3/2014 | Yashiro | G08C 17/02 701/2 |
| 2014/0111483 A1 | 4/2014 | Harrison et al. | |
| 2014/0191938 A1 * | 7/2014 | Ybanez Zepeda | G06F 3/017 345/156 |
| 2014/0225824 A1 | 8/2014 | Shpunt et al. | |
| 2014/0249681 A1 * | 9/2014 | Yamaguchi | G08C 17/02 700/276 |
| 2015/0100167 A1 * | 4/2015 | Sloo | H04L 67/025 700/278 |
| 2016/0266636 A1 * | 9/2016 | Boshernitzan | G06F 1/3231 |
| 2017/0131783 A1 * | 5/2017 | Boshernitzan | G06F 3/017 |

\* cited by examiner

SYSTEM AND METHOD FOR CONTROLLING A TERMINAL DEVICE

CROSS-REFERENCE TO RELATED APPLICATIONS

The present application claims priority under 35 U.S.C. Section 119(e) from U.S. Provisional Patent Application Ser. No. 62/115,769, filed on 13 Feb. 2015, entitled "CONTROL INTERFACE SYSTEM AND METHOD".

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a manual control system for a terminal device, such as a television, lighting fixture, thermostat or laptop. More particularly, the present invention relates to a control system on an exterior mounting surface independent from the terminal device to be controlled. Even more particularly, the present invention relates to a system to detect gestures on a mounting surface and to generate commands for the terminal device based on detected gestures.

2. Description of Related Art Including Information Disclosed Under 37 CFR 1.97 and 37 CFR 1.98.

With the development of electronic technology, output devices or terminal devices are used daily and are increasingly integrated with interactive features in order to enhance convenience and functionality. Users now can use a control system or controller, such as a remote control device, to adjust lights, curtains, a thermostat etc. Existing control systems include distinct remote control devices dedicated to and associated with the particular output or terminal device to be controlled. Remote control devices can also be associated with more than one terminal device, such as a master controller for electronics and a touchscreen computer tablet made integral with furniture or walls to control lighting and room temperature. Any computer with an interface (keyboard, mouse, touch pad or touchscreen) can be a remote control device for multiple terminal devices with smart technology. Mobile phones are also known to be enabled for controlling terminal devices, such as home security cameras and door locks. Another existing control system involves voice recognition technology.

Existing control systems have limitations. Each output or terminal device typically is associated with a respective remote control device, such as a controller for the cable box, a controller for the DVD player, and a controller for the sound mixer. An excessive number of controllers is needed in order to remotely control multiple devices. Furthermore, an individual controller is often misplaced or left in locations that are not readily accessible to the user. The user must search for a controller or change locations to access the controller. Additionally, voice recognition technology often requires cumbersome training sessions to calibrate for pronunciations and accents of each particular user. Furthermore, voice recognition technology is often impaired by background noise resulting in difficulties for that control system to recognize verbal commands. Additionally, the sound produced by voice commands may be obtrusive in many environments such as in a room where others are sleeping, or in a room while watching a movie.

For remote control devices associated with multiple terminal devices, for example, computer tablets with a touchscreen and computers with touchpads, remote control devices can be built into or integrated into furniture. Smart tables have been built with touchscreens that are able to receive touch-based gestures. In the case of integrating these touchscreen or touch pads into surfaces of structures such as furniture, the cost of the structure is significantly increased due to design modifications required to accommodate the remote control device, and the cost of the components and hardware. Furthermore, aesthetics are often affected. Appearances are altered when furniture, walls and surroundings are filled with touchscreens, touchpads, and other conspicuous devices. Integration of such hardware into furniture also requires the manufacturer to modify existing designs such that the hardware can be accommodated into the structure.

Prior art manual control systems range from buttons on a television remote controller to a touchscreen of a mobile phone. Simple gestures of pressing dedicated buttons and complex gestures of finger motions on a touchscreen are both used to control terminal devices. Various patents and publications are available in the field of these manual control systems.

U.S. Pat. No. 8,788,978, issued to Stedman et al on Jul. 22, 2014, teaches a gesture sensitive interface for a computer. The "pinch zoom" functionality is the subject matter, so that the detection of first and second interaction points, and the relative motion between the points are detected by sensors. A variety of sensors are disclosed to define the field, including a touch screen, camera, motion sensor, and proximity sensors.

World Intellectual Property Organization Publication No. WO2013165348, published for Bess on Nov. 7, 2013, describes a system with at least three accelerometers disposed in different locations of an area with a surface to capture respective vibration data corresponding to a command tapped onto the surface by a user. A processing system receives the vibration data from each accelerometer, identifying the command and a location of the user from the vibration data. A control signal based on the command and the location is generated.

U.S. Patent Publication No. 20140225824, published for Shpunt et al on Aug. 14, 2014, discloses flexible room controls. A control apparatus includes a projector for directing first light toward a scene that includes a hand of a user in proximity to a wall of a room and to receive the first light that is reflected from the scene, and to direct second light toward the wall so as to project an image of a control device onto the wall. A processor detects hand motions within the projected field.

U.S. Patent Publication No. 20120249416, published for Maciocci et al on Oct. 4, 2012, describes another projection system with gesture identification. The projector is a unit worn on the body of the user to project onto surfaces, such as walls and tables. Spatial data is detected by a sensor array. Additional rendering operations may include tracking movements of the recognized body parts, applying a detection algorithm to the tracked movements to detect a predetermined gesture, applying a command corresponding to the detected predetermined gesture, and updating the projected images in response to the applied command.

U.S. Patent Publication No. 20100019922, published for Van Loenen on Jan. 28, 2010, is the known prior art for an interactive surface by tapping. Sound detection is filtered and interpreted either in the system to be controlled or else in the sensors themselves. The direction of movement of a hand stroking the surface can be interpreted as a command to increase or decrease a parameter, such as the sound volume level of a television, for example. Determination of the position of the user's hand is unnecessary.

For a prior art control system, including a set of simple buttons or a complex touchpad, there is a discrete boundary or differentiation between the touch-sensitive region and non-touch regions on a surface of a remote control device. A touch-sensitive region can be bound by the button, the keypad, or the outer edge of a touchpad that is integrated in the surface. Therefore, a command is often processed the moment a contact interaction occurs between a person's hand and the button or touchpad of an activated terminal device. For the prior art light detection devices, there is a discrete boundary of visible light as the touch-sensitive region. Only gestures within the field of projected light and only gestures made, when the projected light is activated, are processed within the control system for commands of the terminal output.

There is a need to remove the boundary between the touch-sensitive region and non-touch regions so that an entire surface can be an interactive zone. For individuals with disabilities, the touch-sensitive region may not be accessible, such as a switch or a touchscreen mounted too high. Sufficient motor control to interact properly with a touchscreen may not be possible for individuals with neuromuscular problems or other physical constraints. Elderly individuals may also need assistance to adequately view buttons and touchscreens, when controlling their terminal devices. There is a need to improve the manual control systems for all types of users with wide ranges of physical abilities.

It is an object of the present invention to provide a system and method for controlling a terminal device.

It is an object of the present invention to provide a manual system to control a terminal device.

It is an object of the present invention to provide an interactive control system based on gestures.

It is another object of the present invention to provide an interactive control system based on physical impact on a surface independent from the terminal device.

It is another object of the present invention to provide an embodiment of the system for controlling a terminal device by contact interactions through an associated mounting surface.

It is another object of the present invention to provide an embodiment of the system for controlling a terminal device with an interactive zone coordinated or aligned with an exterior surface.

It is another object of the present invention to provide an embodiment of the interactive control system to detect a gesture as a contact interaction within an interactive zone set by a sensor.

It is another object of the present invention to provide an embodiment of the system for controlling a terminal device to detect contact interactions associated with a mounting surface as data signals.

It is still another object of the present invention to provide an embodiment of the system for controlling a terminal device to determine a data pattern based on the data signals.

It is still another object of the present invention to provide an embodiment of the system for controlling a terminal device to match a detected data pattern with a gesture profile associated with a command of a terminal device.

It is still another object of the present invention to provide an embodiment of the system for controlling a terminal device by converting a contact interaction detected through a sensor into a command associated with a gesture profile matched to a detected data pattern.

These and other objectives and advantages of the present invention will become apparent from a reading of the attached specification.

BRIEF SUMMARY OF THE INVENTION

Embodiments of the control system of the present invention convert any independent mounting surface into a controller for a terminal device. A physically separate mounting surface, such as a wall or table surface, can be used to activate and deactivate a television or light fixtures, without the user touching either appliance. The control system includes a housing engaged to a mounting surface, a sensor within the housing, a server in communication with the sensor, and a terminal device in communication with the server. The terminal device is to be controlled by gestures associated with the mounting surface.

The housing has an engagement means for a mounting surface, such that the housing can be placed exterior, underneath or interior to the mounting surface. Planar surfaces, such as tables and walls, as well as non-planar surfaces, such as beds, can be mounting surfaces. The engagement means can include an attachment means between the housing to the mounting surface and a transmission portion connecting the sensor to the housing. In some embodiments, the transmission portion has a spring loaded portion to reduce damping of the sensor within the housing.

The sensor forms an interactive zone defined by a range of the sensor, and the interactive zone is aligned with the mounting surface. The interactive zone can be coplanar, overlaying or made integral with the mounting surface. The sensor is in a fixed position relative to the engagement means, so that a contact interaction with the mounting surface within the interactive zone is detected by the sensor as data signals. In an alternate embodiment, there can be more than one sensor. With an additional sensor, there is an additional interactive zone for detecting the same contact interaction on the mounting surface. The additional data signals from the additional sensor can be detected along with the data signals of the sensor.

The contact interaction generates the data signals of the sensor through the transmission portion of the housing. In some embodiments, the contact interaction is comprised of an impact or plurality of impacts on the mounting surface, the data signals having a respective defined peak corresponding to each impact, a measured time period between each defined peak, and a defined time period after a last defined peak. A data pattern for each contact interaction is determined by each defined peak and the defined time period after the last defined peak, and each measured time period between each defined peak, if there is a plurality of impacts. When the sensor is an acoustic sensor, the data signals are sound data, such as volume, intensity, pitch, frequency, and duration. When the sensor is an accelerometer, the data signals are vibration data, such as amplitude, intensity, and duration. Other sensors, such as sensors with mechanical, light, and piezoelectric capabilities can also be incorporated into the control system. Contact interactions, such as tapping, knocking, sweeping, and dragging, can be detected by the sensor as data signals, such that different gestures of a user can be used by the present invention for controlling activity of the terminal device. In an alternate embodiment with more than one sensor, the data signals and the additional data signals can be used to determine the data pattern for the contact interaction.

The server of the present invention is in communication with the sensor, including but not limited to wifi, Bluetooth, local area network, wired or other wireless connection. The server can be comprised of a routing module, a processing module being connected to the routing module, and an output module connected to the processing module. The routing module receives the data signals from the sensor, and the processing module determines the data pattern corresponding to the data signals of the contact interaction. For more than one sensor, the data pattern corresponds to the data signals of the sensor and any additional data signals corresponding to other sensors. The processing module matches the data pattern with a gesture profile. The gesture profile is associated with a command. Once matched, the output module transmits the command to the terminal device.

The terminal device can be an appliance, lighting fixture or climate regulator. Examples include a television, a thermostat, a computer, a software system, a game console, a smartphone, a device running software, a fan, a mattress adjustor, an alarm clock, and a lighting fixture. The terminal device can be comprised of a receiving module and means for initiating activity of the terminal device corresponding to the command. The activity of the terminal device can be dedicate to the particular terminal device, such as powering on and off for a lamp, raising and lowering temperature of a thermostat, answering a phone call on a smartphone, checking calendar software on a table, and changing channels on a television. The receiving module in communication with the server receives the command, and the means for initiating performs the activity. The means for initiating can be a switch or other actuating mechanism to change the status of the terminal device.

Embodiments of the present invention further include a method of controlling a terminal device with the system of the present invention. A housing is installed on a mounting surface by an engagement device. The server is connected so as to be in communication with the sensor, and the terminal device is connected so as to be in communication with the server. A physical impact is made on the mounting surface so as to generate a contact interaction, and the sensor detects the contact interaction as data signals. The server receives the data signals from the sensor and determines a data pattern corresponding to the data signals of the contact interaction. The data pattern is matched to a gesture profile associated with a command. The command is transmitted to the terminal device, so that the terminal device performs an activity according to the command. The gesture related to the mounting surface controls the terminal device, even as the mounting surface is independent from the terminal device.

DETAILED DESCRIPTION OF THE INVENTION

The control system of the present invention is a manual control system for all types of users with wide ranges of physical abilities. Any independent mounting surface can be converted into a controller for a terminal device. Simple gestures associated with the mounting surface can be used to control the terminal device in a different location. Gaining access to a button or switch on a dedicated controller or being able to view and manipulate a complicated menu on a touchscreen are no longer required. An appliance, such as a television or a thermostat, can be activated or deactivated without physically touching either appliance. The user does not have to physically reach the appliance as the terminal device. A separate mounting surface, such as a wall or table surface, is converted into a controller without a touch-sensitive region boundary. Simple physical interactions on an independent surface can now control the terminal device.

Figure 1:
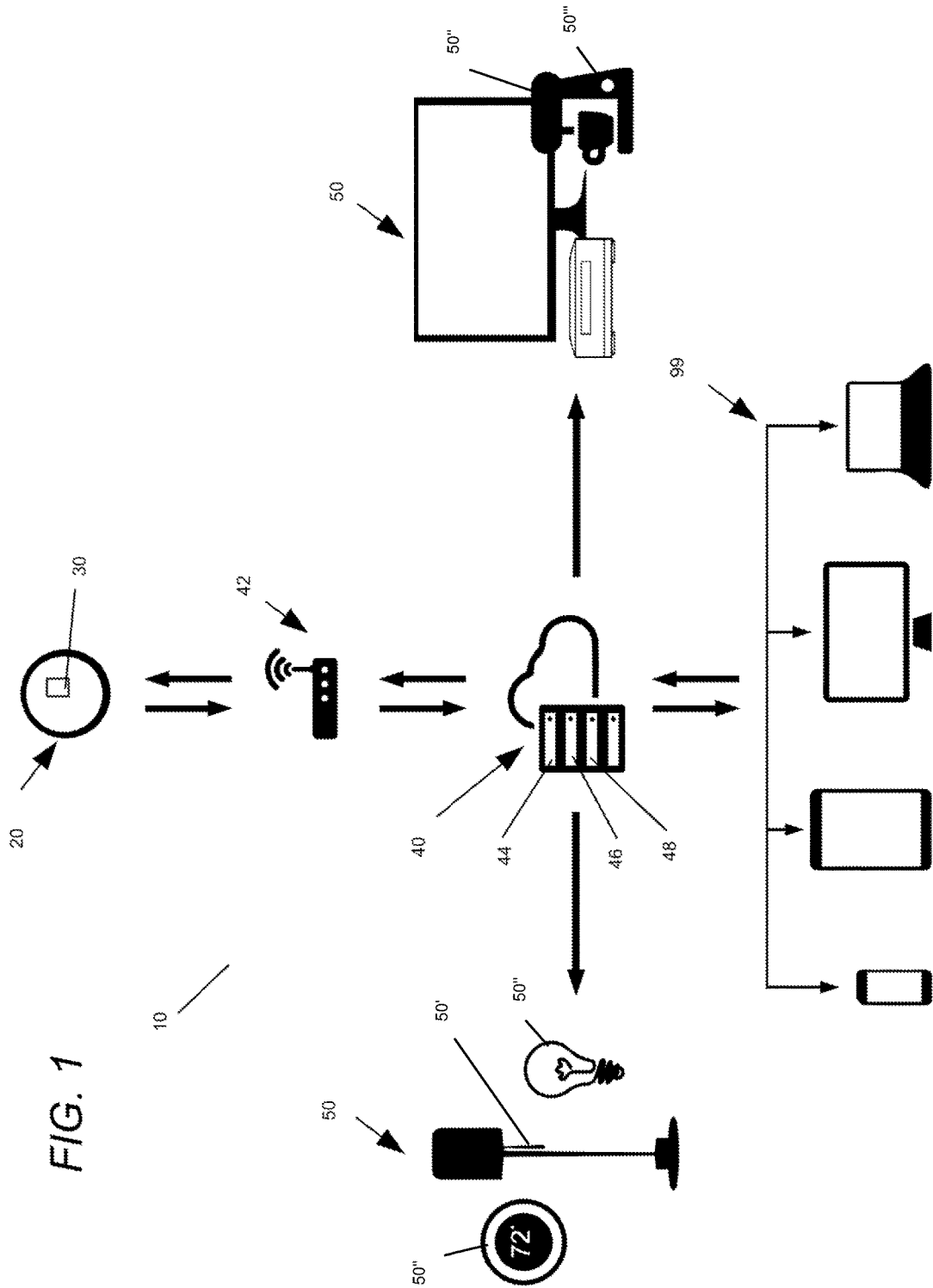
FIG. 1 is a schematic view of an embodiment of the control system of the present invention.
Figure 2:
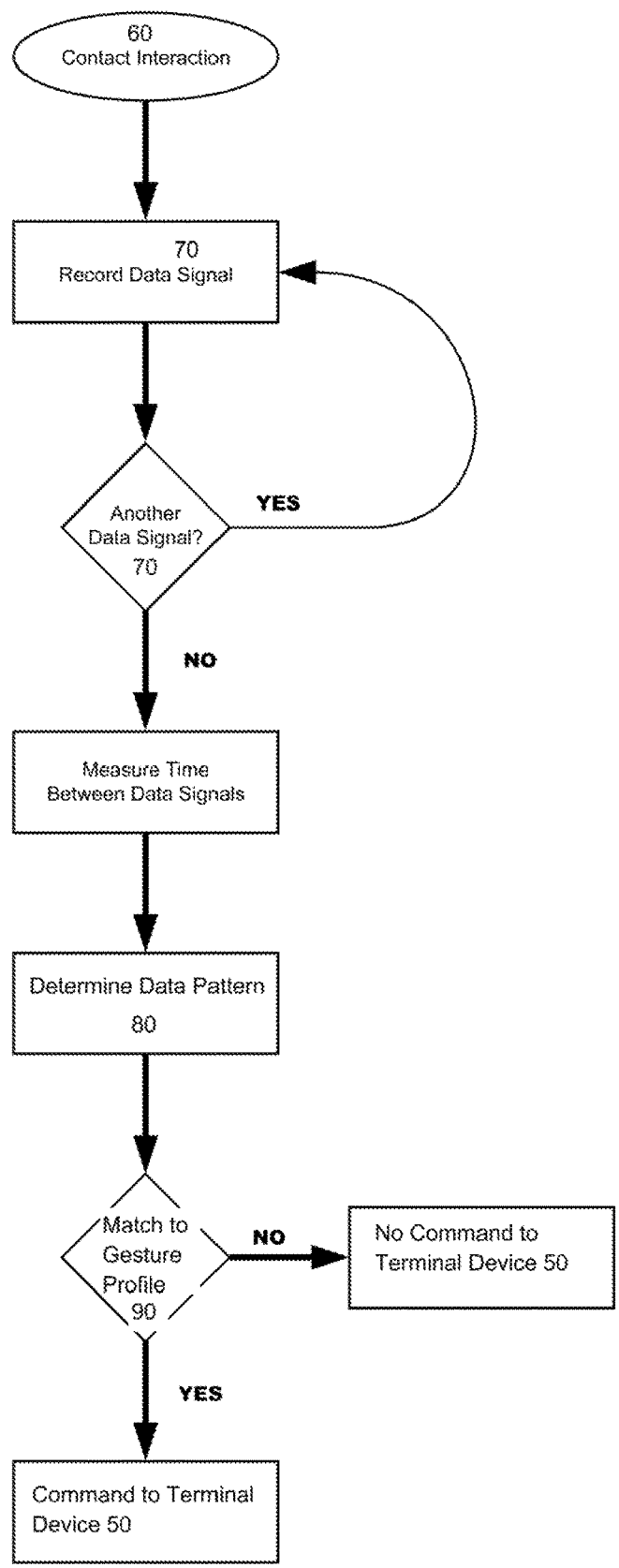
FIG. 2 is flow diagram of the embodiment of the method for controlling a terminal device with the system of the present invention.

Referring to FIGS. 1-2, the control system 10 includes a housing 20 engaged to a mounting surface 22, a sensor 30 within the housing 20, a server 40 in communication with the sensor 30, and a terminal device 50 in communication with the server 40. Interfaces 99 are connected to the server 40 in order to interact with the control system 10. The interfaces 99 can include computers, laptops, tablets and smartphones. FIG. 1 shows a variety of different interfaces 99. The interfaces 99 allow the user to adjust the settings of the control system 10. Gestures by a user associated with the mounting surface 22 control the terminal device 50 in FIGS. 5 and 7-9. In some embodiments, the devices that are interfaces 99 could also be terminal devices 50.

Figure 3:
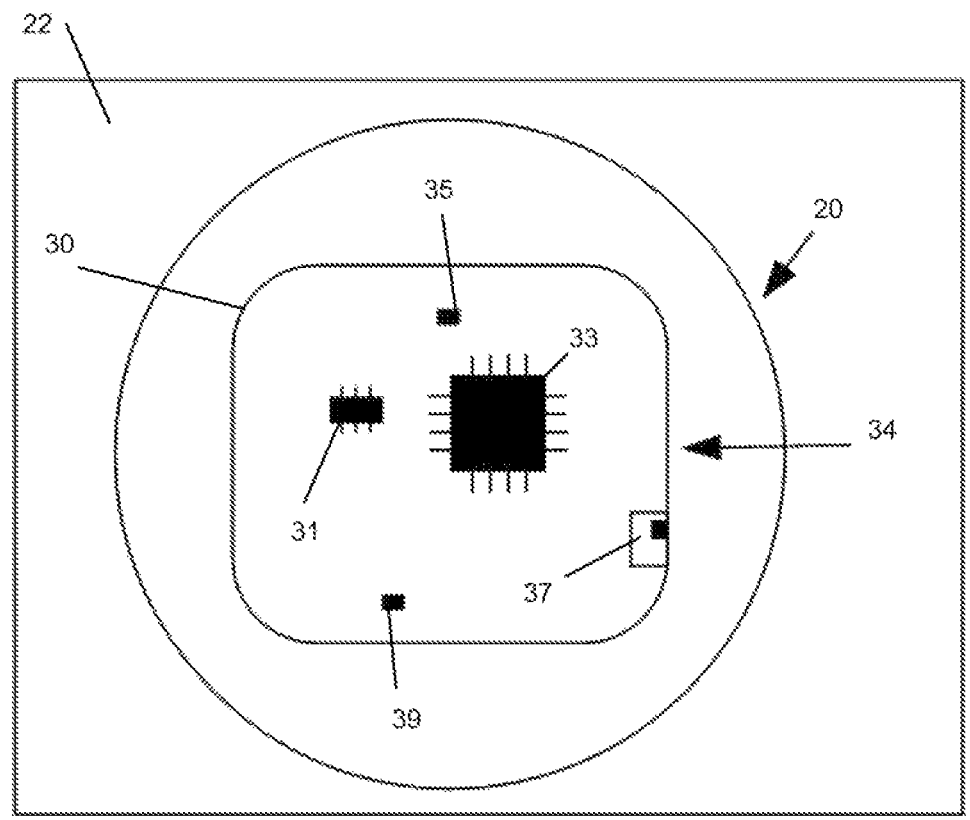
FIG. 3 is a schematic view of an embodiment of the housing and sensor of the control system of the present invention.
Figure 4:
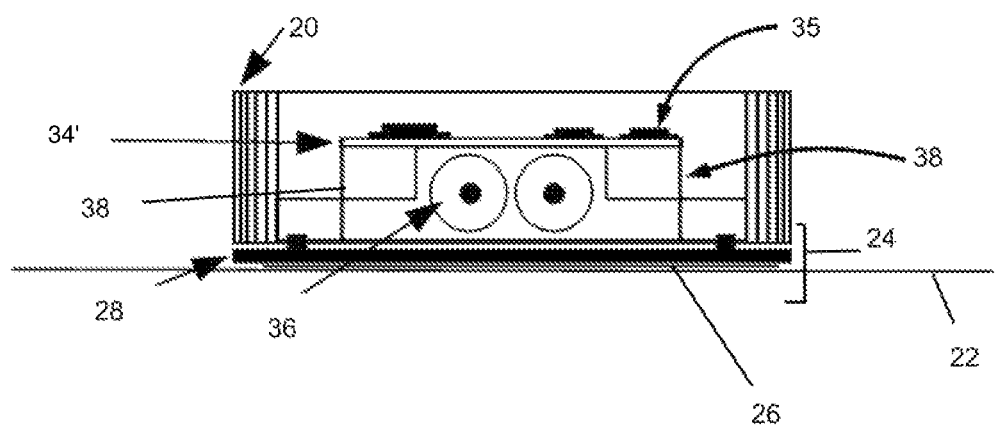
FIG. 4 is a side elevation view of the embodiment of the housing and sensor of FIG. 3.

In FIGS. 3-4, the housing 20 is comprised of an engagement means 24 for a mounting surface 22. FIGS. 5 and 7-9 show that the housing 20 can be placed exterior, underneath or interior to the mounting surface 22. Planar surfaces, such as tables and walls, as well as non-planar surfaces, such as beds, can be mounting surfaces 22. FIG. 4 shows an embodiment of the engagement means 24 being comprised of an attachment means 26 between the housing 20 to the mounting surface 22 and a transmission portion 28 connecting the sensor 30 to the housing 20. The attachment means 26 can be an adhesive, mechanical fasteners, threaded screws or other components to hold the housing 20 to the mounting surface 22. In some embodiments, the transmission portion 28 can be comprised of frames and brackets 38 or a spring loaded portion (not shown) so as to reduce damping. There is a rigid positioning of the sensor 30 relative to the mounting surface 22 through the housing 20. Any sound or vibration of the mounting surface 22 is transmitted to the sensor 30. The engagement means 24 attaches the sensor 30 and reduces damping so that sensor 30 more accurately detects the mounting surface 22. The transmission portion 28 affects sound or vibration or other stimuli from the mounting surface 22 to the sensor 30.

The control system 10 of the present invention includes a sensor 30 as shown in FIGS. 3-4. The housing 20 contains the sensor 30 comprised of a printed circuit board 34' with a flash memory 31, microcontroller unit (MCU) 33, the sensor unit 35, antenna 37, and light emitting diode 39. The sensor unit 35 can be an accelerometer or acoustic sensor. The microcontroller unit 33 and antenna 37 can have wifi capability for communication with the server 40. The relationship between the sensor unit 35 of the sensor 30 and the transmission portion 28 of the housing 20 is shown. The rigid position of the sensor 30 establishes the transmission of the contact interaction to the sensor 30. Other parts in the housing 20 include batteries 36 as a known power supply for the control system 10. The stable construction of the housing 20 and the sensor 30 enable the accurate and efficient conversion of the gestures into commands for the terminal device 50.

Figure 5:
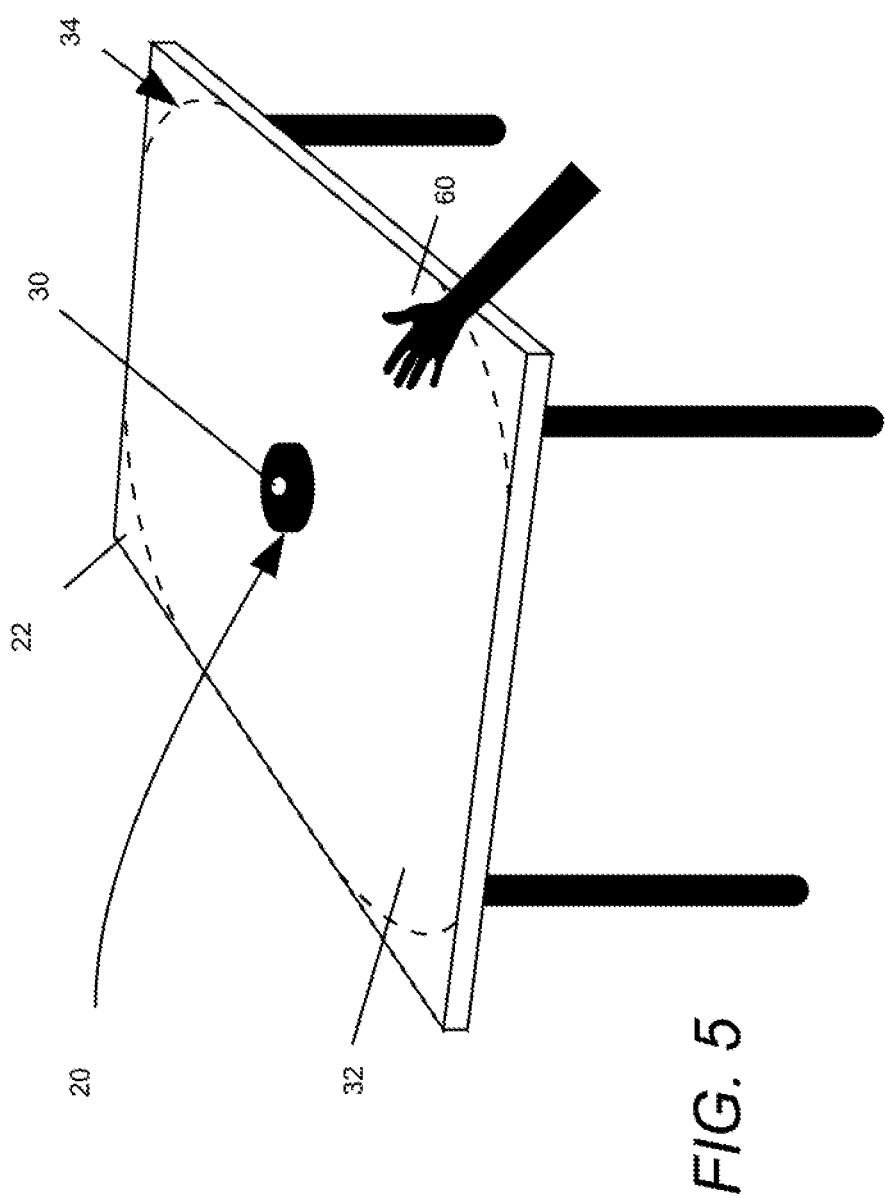
FIG. 5 is a top plan view of an embodiment of the housing on a mounting surface of the present invention.
Figure 6:
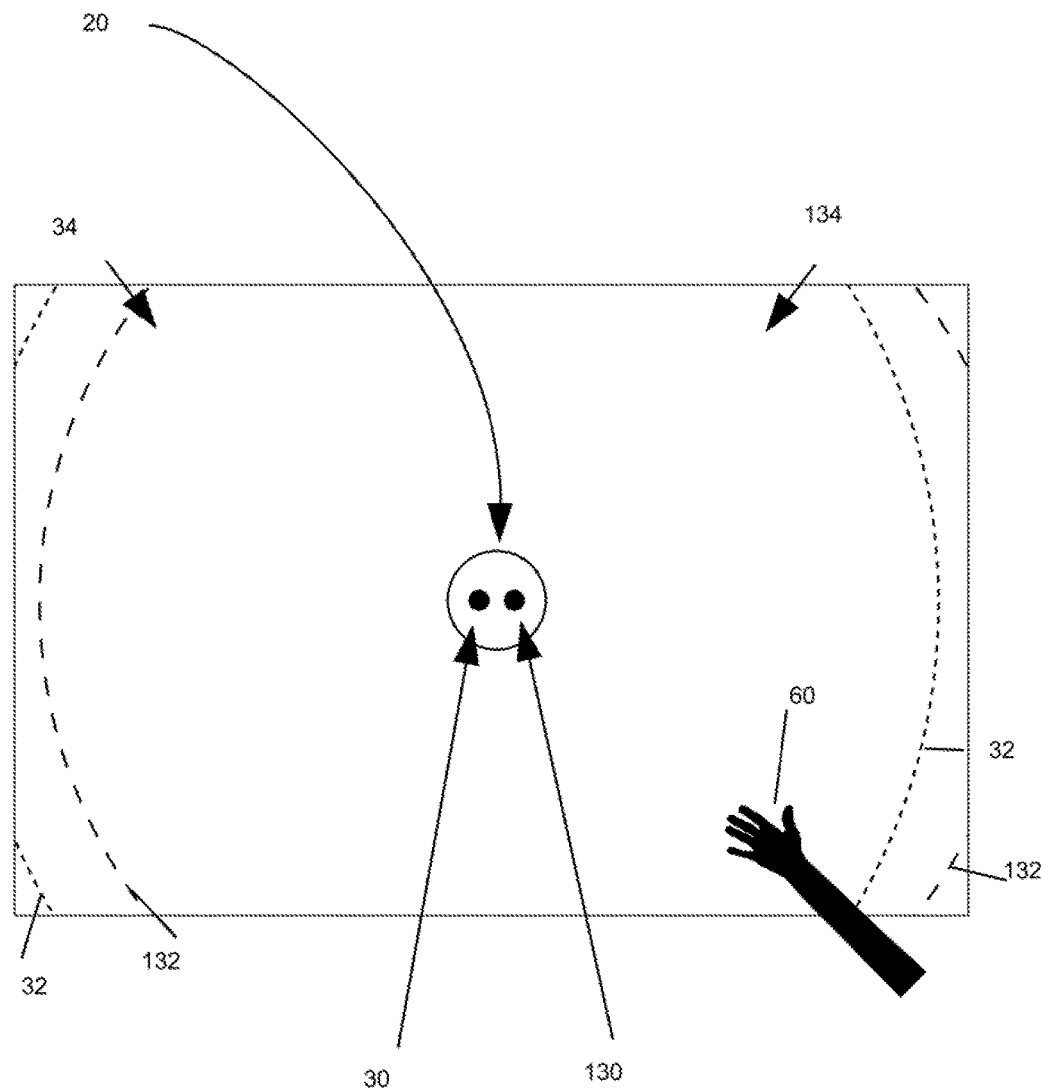
FIG. 6 is a top plan view of another embodiment of the housing with a plurality of sensors on the mounting surface of the present invention.

FIGS. 5 and 6 show embodiments of the sensor 30 forming an interactive zone 32 defined by a range 34 of the sensor 30. A contact interaction with the mounting surface 22 within the interactive zone 32 is detected by the sensor 30 as data signals. FIGS. 5 and 6 show the interactive zone 32 aligned with the mounting surface 22, in particular, the interactive zone 32 is coplanar with the mounting surface 22. The contact interaction on the mounting surface 22 is detected by the sensor 30 on the mounting surface 22. In one example, the housing 20 rests on a table, and knocking on the tabletop can control the terminal device 50. The tabletop for knocking and the mounting surface 22 are the same structure.

Figure 7:
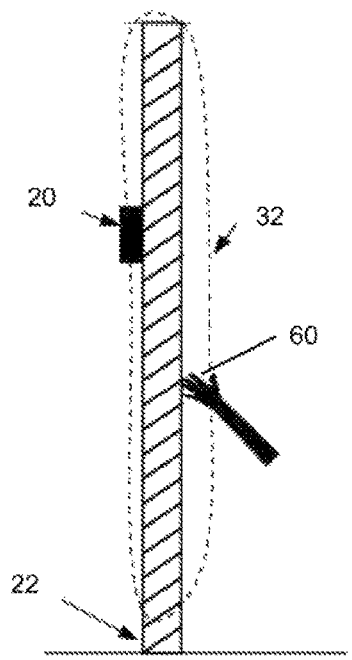
FIGS. 7-9 are schematic views of the housing, interactive zone, and mounting surface of the control system of the present invention.
Figure 8:
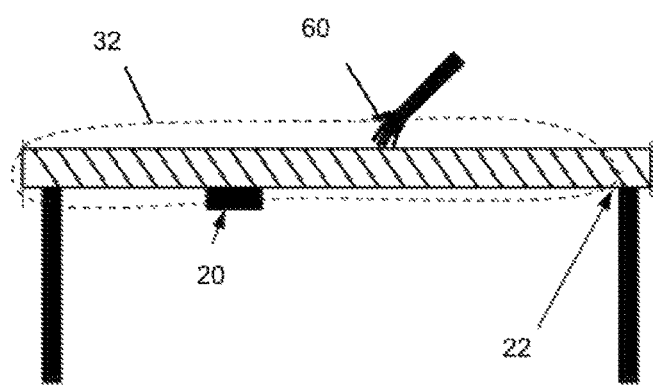
Figure 9:
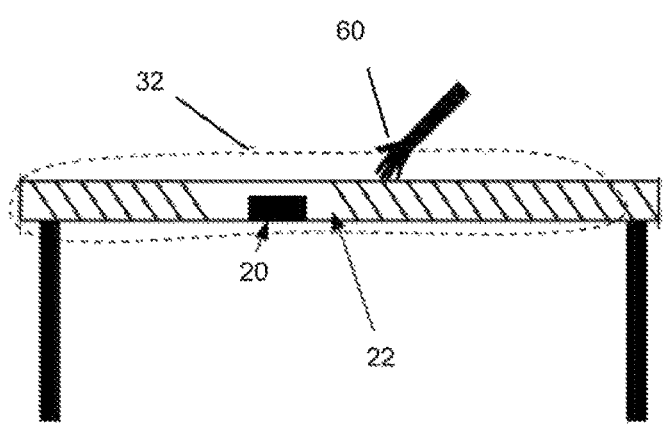

FIGS. 7-9 show other embodiments with the interactive zone 32 aligned with the mounting surface 22 in different positions. FIGS. 7 and 8 show the interactive zone 32 coplanar and overlaying the mounting surface 22. FIG. 7 shows a wall as the mounting surface 22 with the housing 20 behind the wall. The contact interaction is on the wall surface opposite the mounting surface 22, but the knocking on the wall surface is transmitted to the mounting surface 22 and then to the sensor 30. Similarly, FIG. 8 shows a table as the mounting surface 22 with the housing 20 underneath the table. The contact interaction is on the tabletop, opposite to the mounting surface 22. The knocking on the tabletop is transmitted to the mounting surface 22 on the bottom of the table and to the sensor 30. FIG. 9 shows the interactive zone 32 made integral with the mounting surface 22, such as embedded in a table. The mounting surface 22 is within the table, and the tabletop is not the mounting surface 22. The contact interaction is associated with the mounting surface 22 and the contact interaction is detected through the mounting surface 22, even if the contact interaction is not always directly on the mounting surface 22. In the present invention, the sensor 30 is in a fixed position relative to the engagement means 24, so that contact interaction is transmitted through the mounting surface 22 to the sensor 30. Movement, sound waves, and vibration through the mounting surface 22 can be transmitted as efficiently as possible to the sensor 30 through the mounting surface 22 and the engagement means 24.

The engagement means 24 of the housing 20 is cooperative with the sensor 30 so that any contact interaction generates data signals of the sensor through the transmission portion 28 of the engagement means 24. There is less damping of the contact interaction as sound or vibration. The transmission portion 28 can have less damping than the mounting surface 22 or the actual surface of the knocking in the interactive zone 32. In some embodiments, the transmission portion 28 affects transmission of the data signal to the sensor 30. The rigid position of the sensor 30 relative to the mounting surface 22 reduces damping of the contact interaction through the transmission portion 28. The transmission portion 28 can be comprised of a rigid material, such an injection molded frame with flexibility different than the materials of the mounting surface 22 or surface of the contact interaction, if different from the mounting surface 22. In the embodiment with the spring loaded portion (not shown), the spring loaded portion of the transmission portion 28 has less damping than the mounting surface 22 or surface of the contact interaction, if not the same. Sound or vibration has less damping through a spring loaded portion for the transmission of the contact interaction through the transmission portion 28 to the sensor 30. For example, the spring loaded portion as the transmission portion 28 may hold the housing 20 closer and stronger to the mounting surface 22 so as to reduce damping sound or vibration of contact interaction. The data signals of the sensor 30 may have improved clarity and accuracy than systems without the relationship of the sensor 30 within the housing 20 relative to the mounting surface 22 for transmission through to the sensor 30. The sensor 30 can be stabilized relative to the housing 20 on both sides of the printed circuit board 34'. Alternatively, the printed circuit board 34' may be held along multiple points along the perimeter of the printed circuit board 34', including brackets spaced every 120 degrees or ever 90 degrees. The sensor 30 is held in position to prevent flopping and vibrating separate from the mounting surface so that the sensor 30 maintains the proper relationship to the mounting surface 22.

FIG. 2 is a flow diagram of an embodiment of the present invention, showing the data signals of the sensor 30 in relation to the server 40. The contact interaction 60 generates the data signals 70 of the sensor 30 through the transmission portion 28 of the housing 20. In the present invention, the contact interaction 60 is comprised of an impact or plurality of impacts associated with the mounting surface 22. In FIGS. 5 and 6, knocking on the tabletop is also knocking on the mounting surface 22, so the contact interaction 60 is directly on the mounting surface 22. In FIGS. 7-9, knocking on an associated surface of the wall or table is the contact interaction 60. In those embodiments, the impact or plurality of impacts on the associated surface is the contact interaction 60, not an impact on the mounting surface 22. The impacts are coordinated or correspond or translate to the mounting surface 22 for detection by the sensor 30 through the mounting surface 22 as data signals 70.

In the embodiments of the control system 10, the data signals 70 having a respective defined peak corresponding to each impact, a measured time period between each defined peak, and a defined time period after a last defined peak. Each peak is a distinct spike in the data being detected with a quick increase from a baseline or background activity. A data pattern 80 for each contact interaction 60 is determined by each defined peak and the defined time period after the last defined peak, and each measured time period between each defined peak, if there is a plurality of impacts. FIG. 2 shows an embodiment for the contact interaction 60 comprised of one impact or a plurality of impacts. A single knock or a sequence of knocks can be a contact interaction 60. The control system 10 determines the data pattern 80 for contact interactions 60 comprised of a single tap, three quick knocks, two taps, and other sequences. Contact interactions 60, such as tapping, knocking, sweeping, and dragging, can be detected by the sensor 30 as data signals 70. Different gestures of a user can be used by the present invention for controlling activity of the terminal device 50.

A sensor 30 of the present invention can be any known sensor with the same relationship to the other components of the control system 10. The sensor may be a mechanical sensor, a light sensor, piezoelectric sensor, a vibration sensor, or other type of meter. In one embodiment, the sensor 30 is comprised of an acoustic sensor, such that the data signals 70 are comprised of sound data of the contact interaction 60. The sound data can be at least one of volume, intensity, pitch, frequency, duration and a combination thereof. In another embodiment, the sensor 30 is comprised of an accelerometer, such that the data signals 70 are comprised of vibration data of the contact interaction 60. The vibration data can be at least one of amplitude, intensity, duration, and a combination thereof. The data pattern 80 can be determined from data signals 70 of either sound data or vibration data.

FIGS. 1 and 2 show embodiments of the server 40 in communication with the sensor 30. The communication can be wireless or wired. The connection between the server 40 and the sensor 30 can include a router 42, as shown in FIG. 1, and may also include wifi, Bluetooth, local area network, or other connections. In FIG. 1, the server 40 can be comprised of a routing module 44, a processing module 46 being connected to the routing module 44, and an output module 48 connected to the processing module 46. According to FIG. 2, the routing module 44 receives the data signals 70 from the sensor 30. These data signals 70 correspond to the contact interaction 60 associated with the mounting surface 22. The processing module 46 determines the data pattern 80 corresponding to the data signals 70 of the contact interaction 60. The processing module 46 also matches the data pattern 80 with a gesture profile 90. The gesture profile 90 is associated with a command, such as power off or change channels or dim intensity. Then, the output module 48 transmits the command to the terminal device 50. For example, when the terminal device 50 is a television, a contact interaction 60 of two knocks can be detected as data signals 70 to generate a data pattern 80. The data pattern 80 can be matched to a gesture profile 90 associated with changing channels up one channel. The output module 48 communicates the command to change channels up one channel through the server 40 to the television as the terminal device 50. An elderly person in a wheelchair is able to change channels by knocking twice on a tabletop instead of locating a dedicated button on the television or fiddling with a touchscreen on a smartphone.

In the control system 10, the terminal device 50 can be an appliance, such as a television, stereo or coffee machine with a switch 50'''. Alternatively, the terminal device 50 may be a device running software, a light with a switch 50' or climate regulator, such as a thermostat, fan or lighting fixture. The activity of the terminal device 50 depends upon the terminal device 50. The activity is dedicated to the particular terminal device 50. The command associated with the gesture profile 90 relates to the particular terminal device 50. Knocking twice on a tabletop can be converted by the control system 10 into a command to change channels on a television or to lower the temperature of a thermostat or to create an entry in an online calendar software program on a computer. The control system 10 can also be used with multiple terminal devices 50, 50''. A gesture profile 90 for a command is specific for an activity for a particular terminal device 50. More than one terminal device 50 can be connected to the server 40 to receive the commands from the sensor 30.

An alternative embodiment of FIG. 6 shows the control system 10 with an additional sensor 130. The housing 20 can contain a plurality of sensors, shown as the sensor 30 and an additional sensor 130. With an additional sensor 130, there is an additional interactive zone 132 for detecting the same contact interaction 60 on the mounting surface 22. The additional interactive zone 132 is defined by an additional range 134 of the additional sensor 130. Similarly, the additional interactive zone 134 is aligned with the mounting surface 22 with the same relationships as the sensor 30, since the additional sensor 130 is within the same housing 20. The additional sensor 130 remains in a fixed position relative to the engagement means 24 of the housing 20 and in communication with the server 40. The contact interaction 60 associated with the mounting surface 22 within the additional interactive zone 132 is detected by the additional sensor 130 as additional data signals, and the processing module 46 determines the data pattern 80 corresponding to the data signals 70 of the sensor 30 and the additional data signals of the additional sensor 130. FIG. 6 shows the interactive zone 32 of the sensor 30 overlapping with the additional interactive zone 132 of the additional sensor 130. The sensor 30 and additional sensor 130 can be the same or different, such as two acoustic sensors or two accelerometers or one of each. The data pattern 80 can be more robust for more reliable matching with a gesture profile 90. Background interference and resolution can be filtered with more consistency.

Embodiments of the present invention include the method of controlling a terminal device 50 as shown in FIGS. 1 and 2. The method includes installing a housing 20 on a mounting surface 22 by an engagement device 24 with the sensor 30 contained within the housing 20. The sensor 30 forms an interactive zone 32 defined by a range 34 of the sensor 30 and aligned with the mounting surface 22. The method further comprises connecting a server 40 in communication with the sensor 30, and connecting a terminal device 50 in communication with the server 40.

A physical impact is made associated with the mounting surface 22 and within the interactive zone 32 so as to generate a contact interaction 60. The contact interaction 60 is detected as data signals 70 by the sensor 30. The data signals 70 are sent from the sensor 30 to the server 40. In some embodiments, the server 40 is comprised of a routing module 44, a processing module 46 being connected to the routing module 44, and an output module 48 connected to the processing module 46. Furthermore, the terminal device 50 can have a receiving module 52. The data signals 70 are received with the routing module 44 of the server 40, and the processing module 46 determines a data pattern 80 corresponding to the data signals 70 of the contact interaction 60.

The data pattern 80 is matched to a gesture profile 90 with the processing module 46. Each gesture profile 90 is associated with a command, depending upon the terminal device 50. The command is designated for the particular terminal device 50, such as changing channels for a television or lowering temperature for a thermostat. The method includes transmitting the command to the receiving module 52 of terminal device 50 with the output module 48 of the server 40. Then, the terminal device 50 performs the activity according to the command.

Alternative embodiments include making a plurality of physical impacts associated with the mounting surface 22, such that the contact interaction 60 is more than one physical impact and the data pattern 80 is determined by more than one impact. Still another embodiment includes the housing containing an additional sensor 130 connected to the server 40. The step of detecting the contact interaction as data signals 70 with the sensor 40 in combination with additional data signals 170 with the additional sensor 130. Also, the step of receiving the data signals from the sensor with the routing module further comprises receiving the additional data signals 170 from the additional sensor with the routing module 44. With a plurality of sensors, the step of determining the data pattern 80 further comprises determining the data pattern corresponding to the data signals 70 and the additional data signals 170 with the processing module 46. The method also includes making a plurality of physical impacts when the housing 20 contains a plurality of sensors 30, 130.

The present invention is a system and method for controlling a terminal device. The user manually controls the terminal device, unlike manual controls of the prior art. The prior art systems range from a simple button dedicated to a particular activity on a dedicated remote control device to a touchscreen with much more functionality than only controlling the terminal device. There are serious drawbacks for accessibility and complexity, especially for users with different physical abilities. The present invention provides an interactive control system based on gestures to address the different physical abilities of all possible users. The control system enables knocking, tapping, and other gestures as physical impacts on an independent surface to control a device without the accessibility and complexity disadvantages of the prior art. An exterior surface independent from the terminal device becomes a controller. Contact interactions associated with the mounting surface and within the interactive zone of the sensor are detected as data signals for conversion into actual performance of an activity by a terminal device.

As described herein, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

The foregoing disclosure and description of the invention is illustrative and explanatory thereof. Various changes in the details of the illustrated structures, construction and method can be made without departing from the true spirit of the invention.

We claim:

1. A control system comprising:
    a housing having an engagement means for a mounting surface;
    a sensor contained within said housing, said sensor forming an interactive zone defined by a range of said sensor, said sensor being comprised of an accelerometer, said interactive zone being aligned with said mounting surface and overlaying said mounting surface outside a perimeter of said housing, said sensor being in a fixed position relative to said engagement means, wherein a contact interaction associated with said mounting surface within said interactive zone is detected by said sensor as data signals, said contact interaction being comprised of an impact on said mounting surface, said data signals being comprised of vibration data of said contact interaction;
    a server in communication with said sensor, said server being comprised of a routing module, a processing module being connected to said routing module, and an output module connected to said processing module, said routing module receiving said data signals from said sensor, said processing module determining a data pattern corresponding to said data signals of said contact interaction and matching said data pattern with a gesture profile, said gesture profile being associated with a command; and
    a terminal device being comprised of a receiving module and means for initiating activity of said terminal device corresponding to said command, said terminal device being in communication with said server, said output module transmitting said command to said receiving module,
    wherein said engagement means of said housing comprises:
    an attachment means between said housing to said mounting surface; and
    a transmission portion connecting said sensor to said attachment means of said housing and being comprised of a material with flexibility different than said mounting surface so as to set a rigid position of said sensor relative to said mounting surface, said contact interaction generating said data signals of said sensor through said transmission portion.

2. The control system, according to claim 1, wherein said interactive zone of said sensor aligns with said mounting surface, said interactive zone being coplanar with said mounting surface.

3. The control system, according to claim 1, wherein said transmission portion is comprised of a spring loaded portion so as to reduce damping of said contact interaction.

4. The control system, according to claim 1, wherein said contact interaction is comprised of an impact on said mounting surface, said data signals having a respective defined peak corresponding to each impact, a defined time period after a last defined peak, said data pattern being comprised of each defined peak and said defined time period after said last defined peak.

5. The control system, according to claim 1, wherein said contact interaction is comprised of a plurality of impacts on said mounting surface, said data signals having a respective defined peak corresponding to each impact, a measured time period between each defined peak, and a defined time period after a last defined peak, said data pattern being comprised of each defined peak, each measured time period, and said defined time period after said last defined peak.

6. The control system, according to claim 1, further comprising:
- an additional sensor contained within said housing, said additional sensor forming an additional interactive zone defined by an additional range of said additional sensor, said additional interactive zone being aligned with said mounting surface, said additional sensor being in a fixed position relative to said engagement means, said server being in communication with said additional sensor,
- wherein said contact interaction with said mounting surface within said additional interactive zone is detected by said additional sensor as additional data signals,
- wherein said processing module determines said data pattern corresponding to said data signals of said sensor and said additional data signals of said additional sensor.

7. The control system, according to claim 6, wherein said interactive zone of said sensor overlaps with said additional interactive zone of said additional sensor.

8. The control system, according to claim 1, wherein said terminal device is comprised of one device selected from a group consisting of: a television, a thermostat, a computer, a software system, a game console, a fan, a mattress adjustor, an alarm clock, and a lighting fixture.

9. The control system, according to claim 1, further comprising:
- an additional terminal device being comprised of an additional receiving module and additional means for initiating activity of said additional terminal device corresponding to an additional command, said additional terminal device being in communication with said server, said output module transmitting said additional command to said additional receiving module.

10. A method of controlling a terminal device, the method comprising the steps of:
- installing a housing on a mounting surface by an engagement device, said housing being comprised of a sensor contained within said housing, said sensor being comprised of an accelerometer, said sensor forming an interactive zone defined by a range of said sensor, said interactive zone being aligned with said mounting surface and overlaying said mounting surface outside a perimeter of said housing, said sensor being in a fixed position relative to said engagement device,
- wherein said engagement device of said housing comprises:
- an attachment device between said housing to said mounting surface; and
- a transmission portion connecting said sensor to said attachment device of said housing and being comprised of a material with flexibility different than said mounting surface so as to set a rigid position of said sensor relative to said mounting surface;
- connecting a server in communication with said sensor, said server being comprised of a routing module, a processing module being connected to said routing module, and an output module connected to said processing module;
- connecting a terminal device in communication with said server, said terminal device being comprised of a receiving module;
- making a physical impact on said mounting surface so as to generate a contact interaction;
- detecting said contact interaction as data signals with said sensor, said data signals being comprised of vibration data of said contact interaction, said contact interaction generating said data signals of said sensor through said transmission portion;
- receiving said data signals from said sensor with said routing module of said server;
- determining a data pattern corresponding to said data signals of said contact interaction with said processing module;
- matching said data pattern to a gesture profile with said processing module, said gesture profile being associated with a command;
- transmitting said command to said receiving module of terminal device with said output module of said server, said command corresponding to activity of said terminal device; and
- performing said activity with said terminal device.

11. The method of controlling the terminal device, according to claim 10, wherein the step of making a physical impact on said mounting surface further comprises making a plurality of physical impacts on said mounting surface, said contact interaction being associated with more than one physical impact.

12. The method of controlling the terminal device, according to claim 10, wherein said housing is further comprised of an additional sensor, said additional sensor being connected to said server,
- wherein the step of detecting said contact interaction as data signals with said sensor further comprises detecting said contact interaction as additional data signals with said additional sensor;
- wherein the step of receiving said data signals from said sensor with said routing module further comprises receiving said additional data signals from said additional sensor with said routing module, and
- wherein the step of determining said data pattern further comprises determining said data pattern corresponding to said data signals and said additional data signals with said processing module.

13. The method of controlling the terminal device, according to claim 12, wherein the step of making a physical impact on said mounting surface further comprises making a plurality of physical impacts on said mounting surface, said contact interaction being associated with more than one physical impact.

* * * * *